(12) United States Patent
Ogawa et al.

(10) Patent No.: US 7,381,128 B2
(45) Date of Patent: Jun. 3, 2008

(54) OPERATING DEVICE OF AIR CONDITIONER FOR VEHICLE

(75) Inventors: Satoshi Ogawa, Aichi (JP); Tomoyuki Shibata, Aichi (JP); Yoshiyuki Aoki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 589 days.

(21) Appl. No.: 10/947,336

(22) Filed: Sep. 23, 2004

(65) Prior Publication Data

US 2005/0064807 A1 Mar. 24, 2005

(30) Foreign Application Priority Data

Sep. 24, 2003 (JP) .................. P. 2003-332058

(51) Int. Cl.
*B60H 1/00* (2006.01)
*G05G 1/10* (2006.01)
*F16H 35/18* (2006.01)

(52) U.S. Cl. ................ 454/69; 454/143; 74/553

(58) Field of Classification Search ............. 454/69, 454/143; 74/10.45, 553; 237/12.3 R
See application file for complete search history.

(56) References Cited

U.S. PATENT DOCUMENTS

| 4,995,554 | A | * | 2/1991 | Auvity et al. ............. 236/51 |
| 5,093,764 | A | * | 3/1992 | Hasegawa et al. ......... 362/29 |
| 5,120,270 | A | * | 6/1992 | Kato et al. ............... 454/126 |
| 5,873,520 | A | * | 2/1999 | Ratgeber et al. .......... 236/94 |
| 6,378,388 | B1 | * | 4/2002 | Lacroix .................. 74/10.85 |
| 6,667,446 | B1 | * | 12/2003 | Schuberth et al. ......... 200/4 |
| 2002/0045419 | A1 | | 4/2002 | Lacroix |
| 2003/0006958 | A1 | * | 1/2003 | Onodera ................. 345/156 |

FOREIGN PATENT DOCUMENTS

| DE | 19633892 A1 | * | 2/1998 |
| DE | 203 06 489 U | | 7/2003 |
| EP | 605324 A1 | * | 7/1994 |
| EP | 1 340 633 | | 9/2003 |
| FR | 2 815 293 | | 4/2002 |
| JP | 2001184969 A | * | 7/2001 |
| JP | 2002002259 A | * | 1/2002 |
| JP | 2004210019 A | * | 7/2004 |

* cited by examiner

*Primary Examiner*—Patrick F. O'Reilly, III
(74) *Attorney, Agent, or Firm*—Morgan, Lewis & Bockius LLP

(57) ABSTRACT

A gear portion is provided on the inner peripheral surface of a dial, and a large diameter portion of a main driving gear is mated with the gear portion. A driven gear is mated with a small diameter portion of the main driving gear, and the state of an air conditioner is switched based on the moving operation of a cable through the gear portion, the main driving gear and the driven gear in the rotating operation of the dial. With this structure, it is not necessary to provide a rotary shaft as a member for transmitting an operating force to the central part or the dial. Consequently, it is possible to maintain a space in the central part of the dial. Thus, restrictions can be decreased in the case in which a knob is to be arranged.

12 Claims, 9 Drawing Sheets

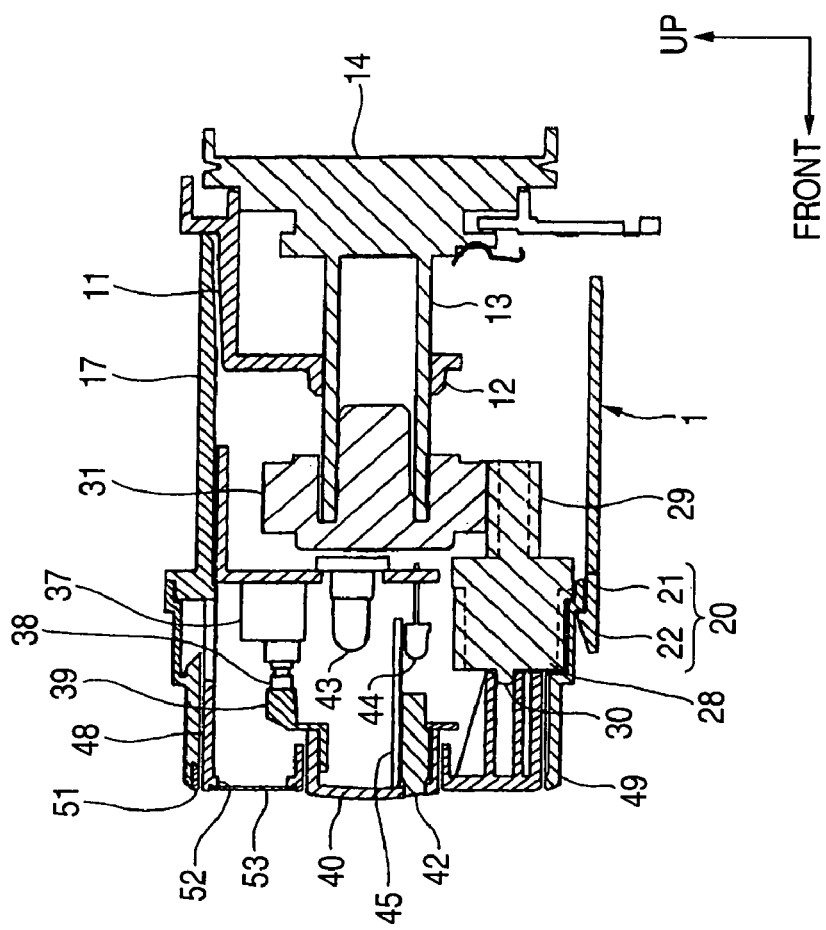
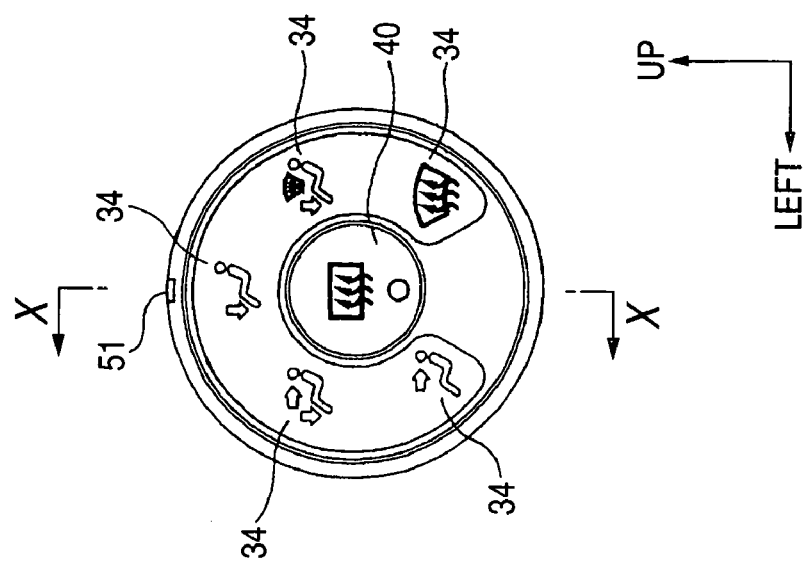

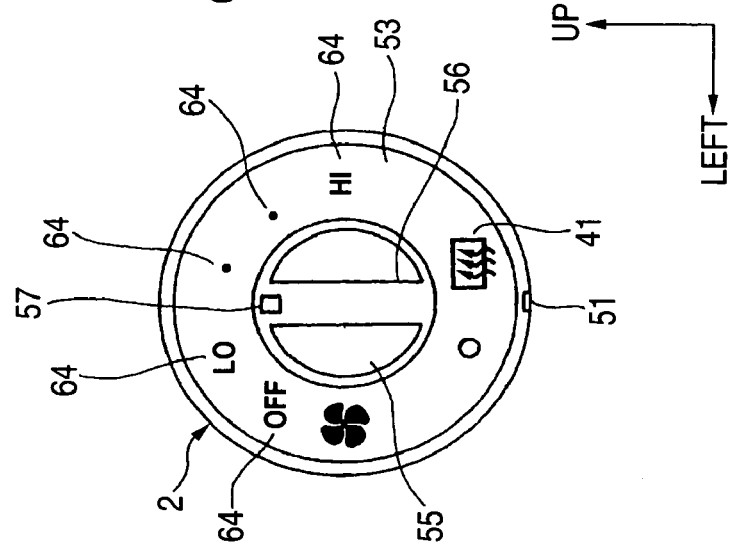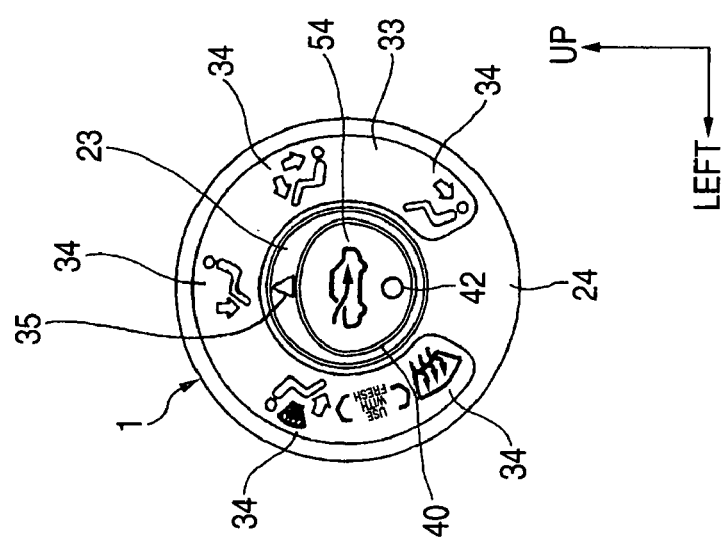

OPERATING DEVICE OF AIR CONDITIONER FOR VEHICLE

BACKGROUND OF THE INVENTION

The present invention relates to an operating device for operating a vehicle air conditioner in a vehicle.

Some operating devices have such a structure that an operating member is directly coupled to the rotary shaft of a dial and is directly operated based on the rotating operation of the dial. The operating member is mechanically coupled to an air conditioner, and the state of the air conditioner is changed based on the operation of the operating member by the operating force of the dial.

With this structure, a rotary shaft is present as a member for transmitting an operating force in the central part of the dial. For this reason, it is hard to maintain a space in the central part of the dial and there are many restrictions on the arrangement of separate components on the dial.

SUMMARY OF THE INVENTION

In consideration of the circumstances, the invention has been made and has an object to provide an operating device of an air conditioner for a vehicle which can decrease restrictions on the arrangement of separate components on a dial.

In order to solve the aforesaid object, the invention is characterized by having the following arrangement.

(1) An operating device of an air conditioner for a vehicle, comprising:

a dial provided rotatably;

a gear portion that is provided on an inner peripheral surface of the dial;

a main driving gear that includes a first gear portion to be engaged with the gear portion and a second gear portion integrated with the first gear portion;

a driven gear that is engaged with the second gear portion of the main driving gear and is rotated according to a transmission of an operating force of the dial through the main driving gear; and an operating member that is coupled to the driven gear and serves to operate the air conditioner based on the rotation of the driven gear.

(2) The operating device according to (1), wherein a rotating axis of the dial is offset from a rotating axis of the main driving gear.

(3) The operating device according to (1) further comprising an operable knob that is provided in a central part of the dial and is operable to push a switch.

(4) The operating device according to (1) further comprising an inner dial that is rotatably provided in a central part of the dial.

According to the invention, the gear portion is provided on the inner peripheral surface of the dial and the air conditioner is operated based on the transmission of the operating force of the dial from the gear portion to the operating member through the main driving gear and the driven gear. Therefore, it is not necessary to provide a rotary shaft as the member for transmitting the operating force in the central part of the dial. For this reason, a space can be maintained in the central part of the dial. Consequently, restrictions are decreased when other components such as an inner dial and a knob are to be arranged.

BRIEF DESCRIPTION OF THE DRAWINGS

FIGS. 6A and 6B are views corresponding to FIGS. 1A and 1B, illustrating a second example of the invention, FIGS. 8A to 8C are views showing a fourth example of the invention, (FIG. 8A is a front view showing a mode selecting unit, FIG. 8B is a front view showing a blower unit, and FIG. 8C is a front view showing a temperature control unit)

DETAILED DESCRIPTION OF PREFERRED EMBODIMENTS

Figure 4:
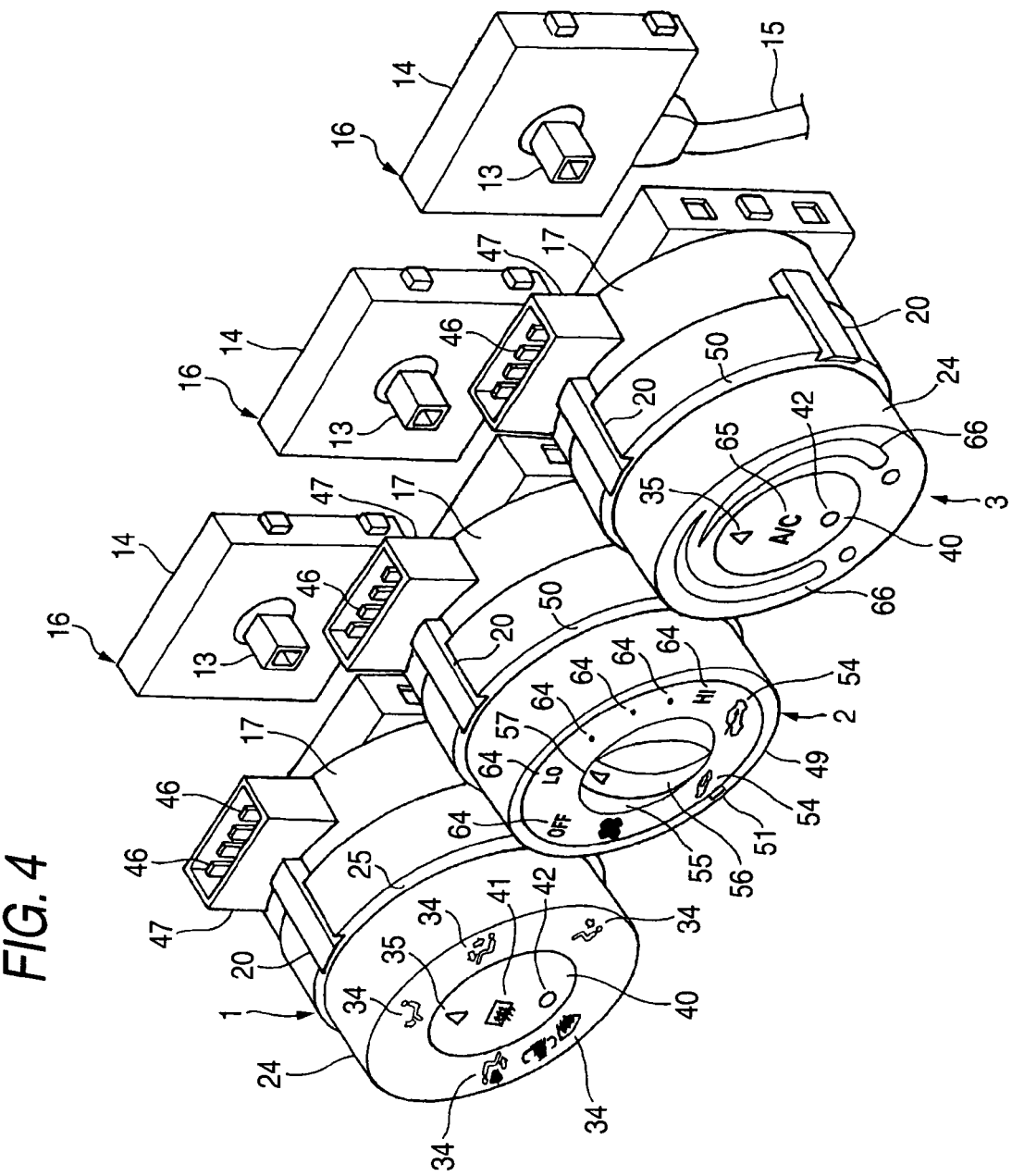
FIG. 4 is a perspective view showing the mode selecting unit, the blower unit, and a temperature control unit.
Figure 5A:
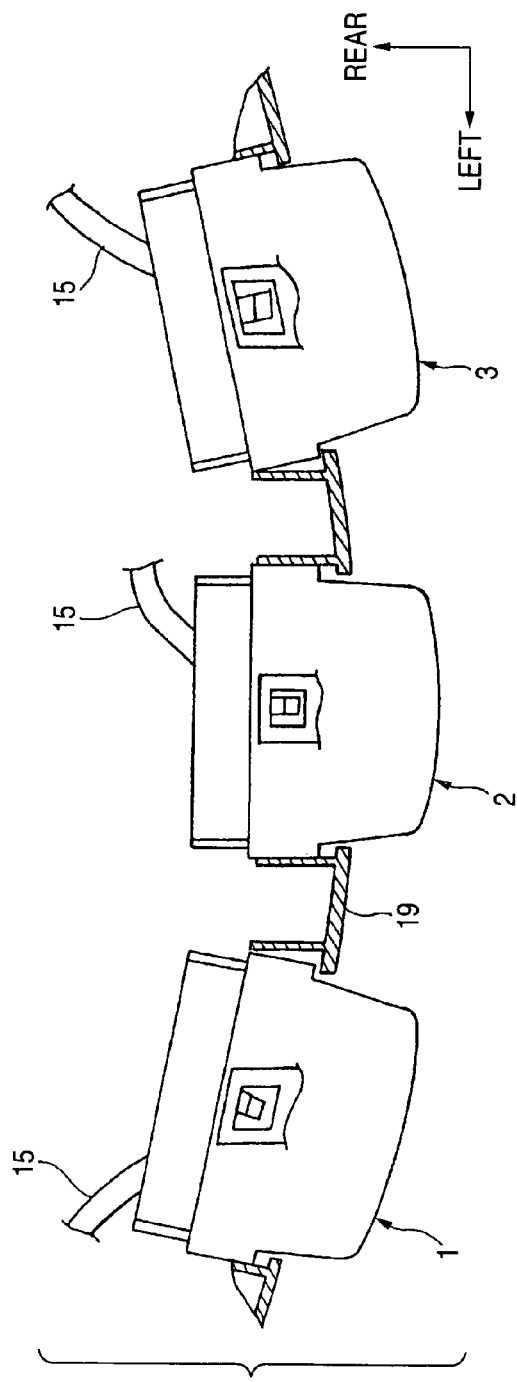
FIGS. 5A and 5B are views showing the mode selecting unit, the blower unit and the temperature control unit in an assembling state (FIG. 5A is a top view and FIG. 5B is a front view)
Figure 5B:
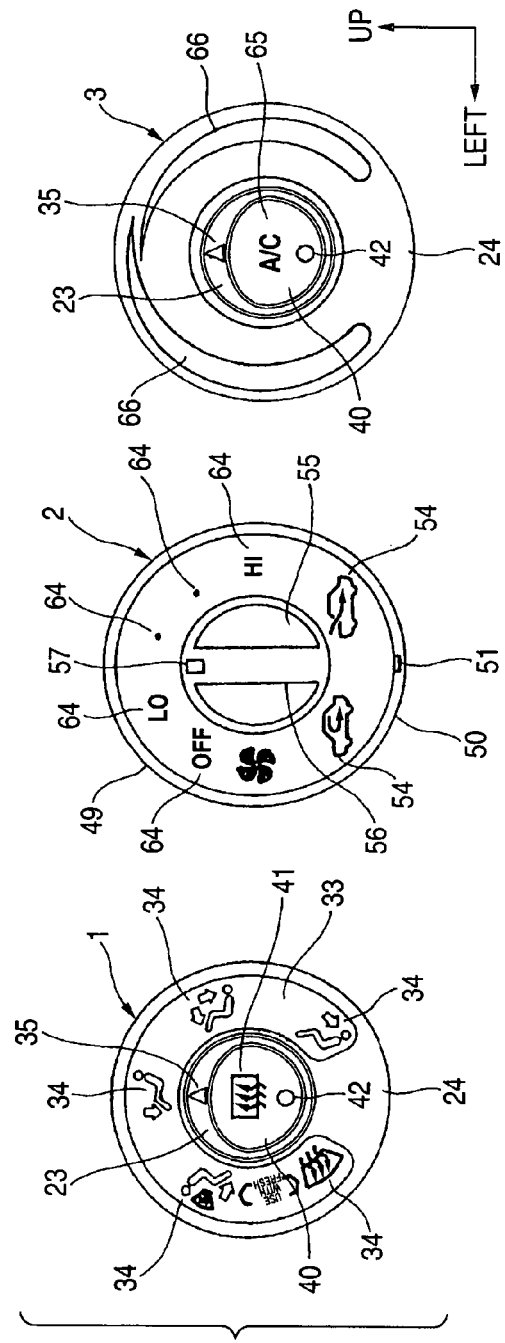

A first example of the invention will be described with reference to FIGS. 1A to 5B. As shown in FIGS. 5A and 5B, a mode selecting unit 1, a blower unit 2 and a temperature control unit 3 are attached into a vehicle. The mode selecting unit 1 to the temperature control unit 3 are separated mechanically, electrically and independently. The detailed structures of the mode selecting unit 1 to the temperature control unit 3 are as follows.

1. Mode Selecting Unit 1

Figure 1B:
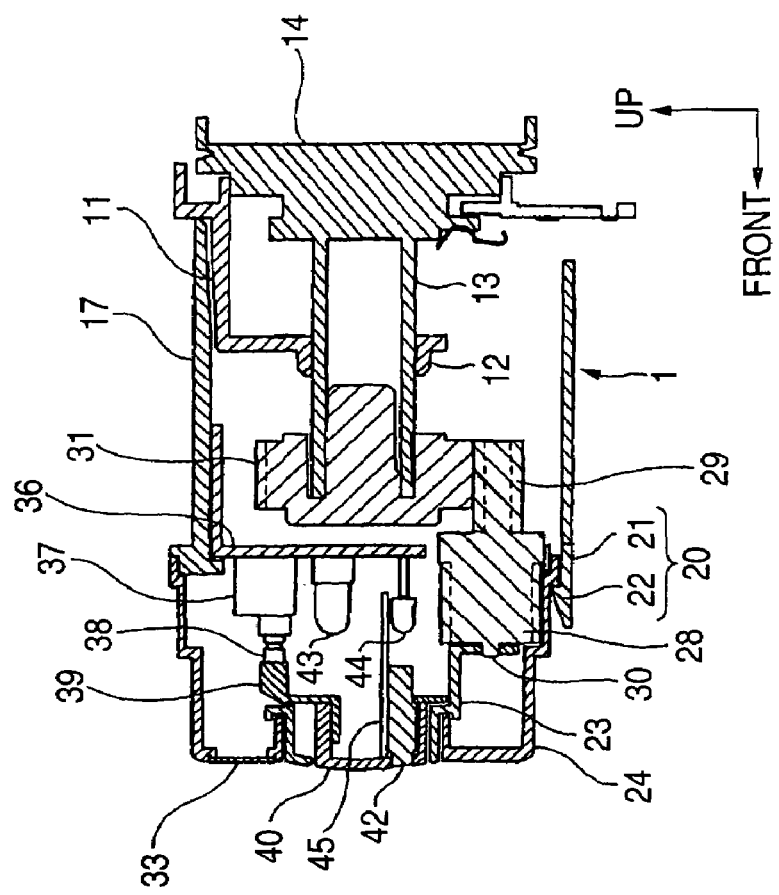
FIGS. 1A and 1B are views showing a first example of the invention (FIG. 1A is a front view showing a mode selecting unit and FIG. 1B is a sectional view taken along an X line)

A unit base 11 formed of a synthetic resin is fixed to the instrument panel side of a vehicle as shown in FIG. 1B. A cylindrical bearing 12 is formed integrally with the unit base 11 and a cylindrical shaft 13 is rotatably fitted in the inner peripheral surface of the bearing 12. The shaft 13 is formed of a synthetic resin as a material, and a cable base 14 is formed integrally with the shaft 13.

Figure 2:
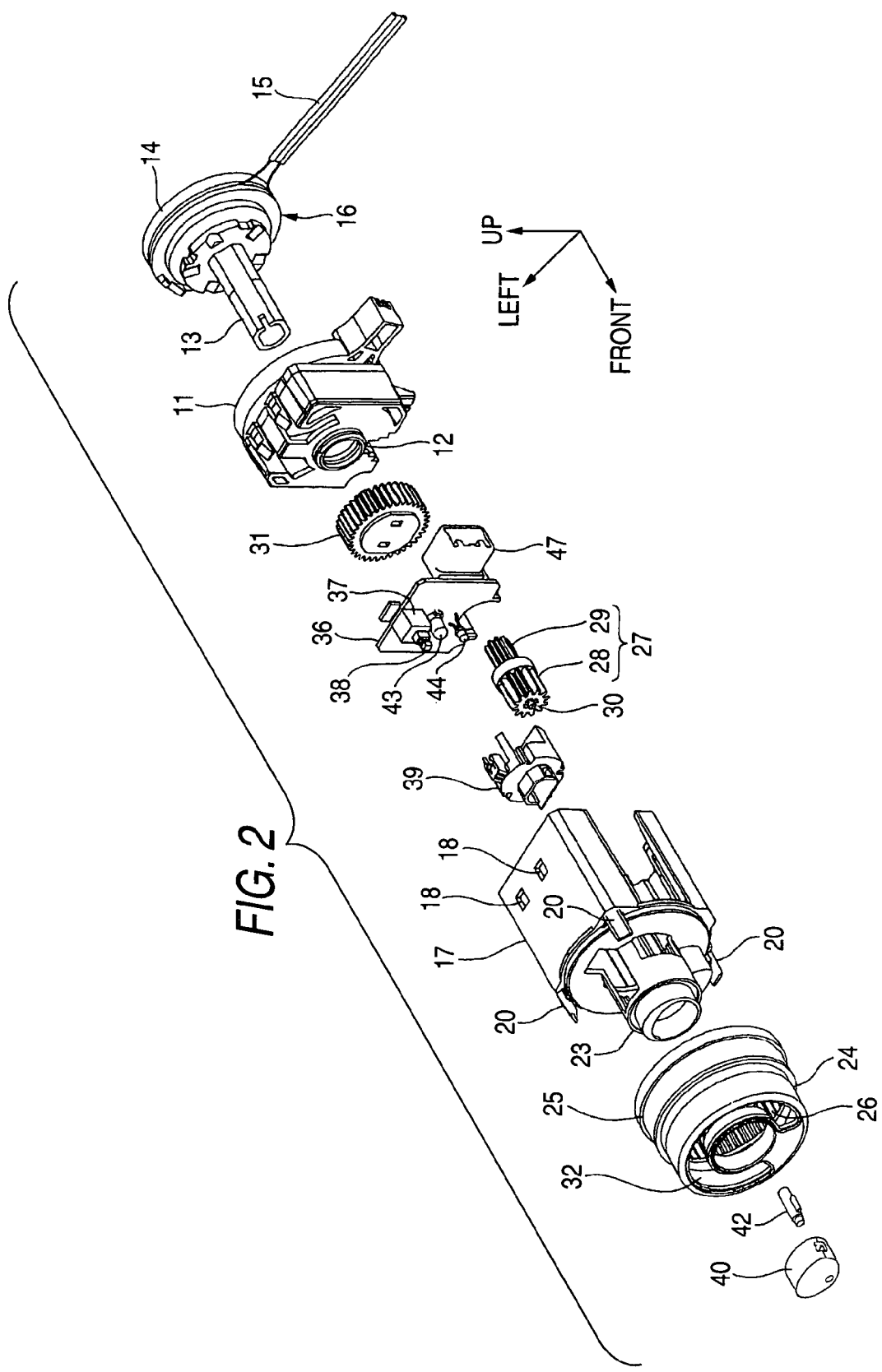
FIG. 2 is an exploded perspective view showing the mode selecting unit.

As shown in FIG. 2, the left end of a cable 15 corresponding to an operating member is attached to the cable base 14, and the right end of the cable 15 is mechanically connected to an air conditioner (not shown). The shaft 13, the cable base 14 and the cable 15 constitute a cable unit 16, and the right end of the cable 15 is moved based on the rotation of the cable base 14 around the shaft 13.

As shown in FIG. 1B, a unit body 17 formed of a synthetic resin is fixed to the unit base 11. A plurality of attachment holes 18 is formed on the unit body 17 as shown in FIG. 2, and the unit body 17 is fixed to a cluster panel 19 (see FIGS. 5A and 5B) based on the engagement of the attachment holes 18 with click portions (not shown) of the cluster panel 19.

As shown in FIG. 2, a plurality of snap fit portions 20 is formed integrally with the outer peripheral portion of the unit body 17. The snap fit portions 20 are arranged at equal pitches in a circumferential direction over a common circular track, and are constituted by a leg portion 21 extended in a longitudinal direction and a protruded click portion 22 positioned in the tip part of the leg portion 21 as shown in FIG. 1B.

As shown in FIG. 2, a cylindrical dial base 23 formed of a colored opaque synthetic resin is formed integrally with the front end of the unit body 17. A dial 24 formed of a synthetic resin is inserted in the outer peripheral portion of the dial base 23 as shown in FIG. 1B, and a ring-shaped seat portion 25 having a large diameter is formed integrally with the rear end of the dial 24 as shown in FIG. 2. A plurality of click portions 22 are engaged with the seat portion 25 as shown in FIG. 1B and the dial 24 is prevented from slipping from the unit body 17 by an engaging force between the click portions 22 and the seat portion 25. More specifically, the dial 24 is rotated with respect to the unit body 17 based on the guide of inner and outer peripheral surfaces by the dial base 23 and the snap fit portions 20.

A gear portion 26 is formed integrally with the inner peripheral surface of the dial 24 as shown in FIG. 2, and a large diameter portion 28 of a main driving gear 27 is mated with the gear portion 26 as shown in FIG. 1B. The main driving gear 27 is formed of a synthetic resin as a material, and has the toothed large diameter portion 28 and a toothed small diameter portion 29 integrally. The main driving gear 27 is attached to the unit body 17 rotatably around a shaft 30, and the main driving gear 27 is rotated relatively to the dial 24 in the operation of the dial 24. The large diameter portion 28 and the small diameter portion 29 correspond to a first gear portion and a second gear portion, respectively.

A driven gear 31 formed of a synthetic resin is mated with the small diameter portion 29 of the main driving gear 27. The driven gear 31 is fixed unrotatably to the shaft 13 and the cable 15 is moved and operated based on the rotating operation of the driven gear 31 through the main driving gear 27 in the operation of the dial 24. In other words, the main driving gear 27 functions as a transmitting member for transmitting the operating force of the dial 24 to the driven gear 31 and a regulating member for regulating the amount of the rotation of the driven gear 31 with respect to the amount of the operation of the dial 24. More specifically, the amount of the operation of the dial 24 and the amount of the rotation of the driven gear 31 are set to be "1:1".

As shown in FIG. 2, an arcuate opening portion 32 is formed on the dial 24. A mark plate 33 formed of a colored opaque synthetic resin is fixed into the opening portion 32 as shown in FIG. 1B, and a plurality of transparent mode marks 34 is fixed to the mark plate 33 as shown in FIG. 1A.

A transparent pointer 35 formed of a synthetic resin is fixed to the dial base 23. The pointer 35 serves to display a wind blow-off position in cooperation with the mode mark 34. More specifically, when the mode marks 34 are selectively opposed to the outer peripheral portion of the pointer 35 based on the rotating operation of the dial 24, the cable 15 is moved corresponding to the rotating position of the dial 24 so that the air conditioner selectively opens a blow-off port corresponding to the result of the selection of the mode mark 34.

As shown in FIG. 1B, a switchboard 36 formed of a synthetic resin is fixed into the unit body 17, and a switch 37 is mechanically fixed to the switch board 36. The switch 37 is formed by a lock type push-push switch which is self-held in an ON state in which a plunger 38 is pushed in rearward, and a knob holder 39 formed of a synthetic resin is mechanically coupled to the plunger 38.

Figure 1A:
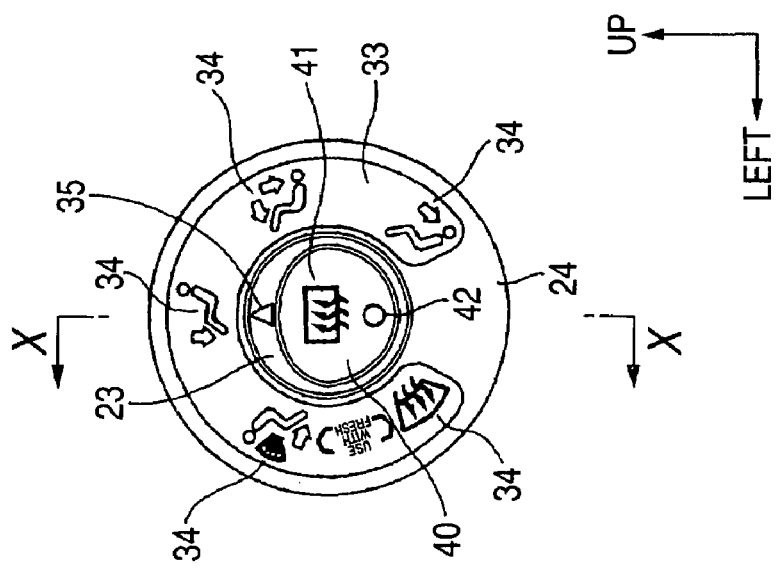

A colored opaque knob 40 formed of a synthetic resin is fixed to the knob holder 39, and a transparent rear defogger mark 41 formed of a synthetic resin is fixed to the knob 40 as shown in FIG. 1A. The knob 40 is accommodated unrotatably in the dial base 23 as shown in FIG. 1B and is provided in the central part of the dial 24 as shown in FIG. 1A. The knob 40 is slidable in a longitudinal direction relatively to the dial 24. When the knob 40 is operated rearward from a forward OFF position, the plunger 38 of the switch 37 is ON-operated through the knob holder 39 and is thus held in an ON position in which the knob 40 is pressed into the dial base 23 by the self holding force of the switch 37. When the knob 40 is pushed in rearward in this state, it slides forward by the restoring force of the plunger 38 based on the operation of the release of the switch 37 and returns to the forward OFF position.

The front end of a lens 42 corresponding to an indicator is inserted in the knob 40 as shown in FIG. 1B. The lens 42 is formed of a colored transparent synthetic resin as a material and is fixed to the knob 40. Moreover, a lamp 43 for rear defogger illumination, an LED 44 for an indicator and a plurality of lamps (not shown) for mode illumination are mechanically fixed to the switch board 36. The lamp 43, the LED 44 and the lamps are provided behind the rear defogger mark 41, the lens 42 and the mode marks 34, and the rear defogger mark 41, the lens 42 and the mode marks 34 are illuminated when the lamp 43, the LED 44 and the lamps emit. light. The lamp 43 corresponds to a light source.

A shielding plate 45 is positioned between the rear defogger mark 41 and the lens 42 and is formed integrally with the knob 40. The shielding plate 45 has a rear end overlapping with the LED 44 in a vertical direction, suppresses the mixture of a light projected from the lamp 43 and a light projected from the LED 44 and converges the light projected from the lamp 43 and the light projected from the LED 44 on the rear defogger mark 41 and the lens 42.

A plurality of conductive plates 46 (see FIG. 4) is mechanically fixed to the switch board 36, and the switch 37, the lamp 43 for rear defogger illumination, the LED 44 for an indicator and the lamps for mode illumination are electrically connected to the conductive plates 46. Moreover, a connector housing 47 is formed integrally with the switch board 36 as shown in FIG. 2. One of the ends of each of the conductive plates 46 is accommodated in the connector housing 47, and the switch 37, the lamp 43 for rear defogger illumination, the LED 44 for an indicator and the lamps for mode illumination are electrically connected to the air conditioner based on the fitting of a harness connector (not shown) in the connector housing 47.

The air conditioner has a rear defogger function of carrying out defogging based on the heating of a rear glass. When the knob 40 is ON operated, the switch 37 is turned ON so that the air conditioner operates the rear defogger function based on the detection of the ON state of the switch 37. Then, the lens 42 is caused to emit a light based on the application of a driving power source to the LED 44 and a driver is informed of the ON operation of the rear defogger function.

2. Blower Unit 2

The blower unit 2 shares a large number of components together with the mode selecting unit 1, and different portions from the mode selecting unit 1 are as follows.

Figure 3B:
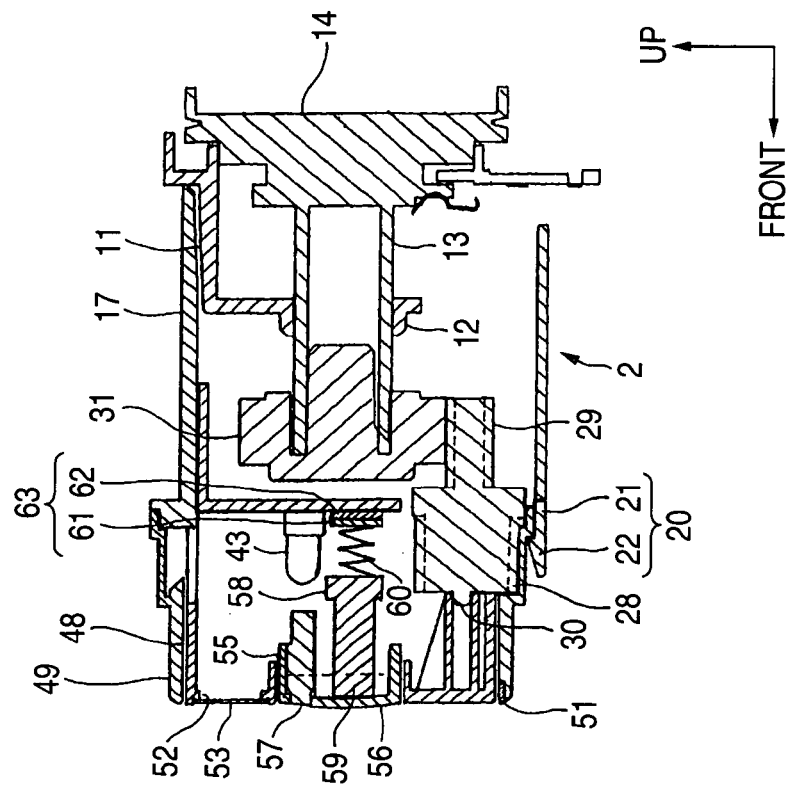
FIGS. 3A and 3B are views corresponding to FIGS. 1A and 1B, illustrating a blower unit.

As shown in FIG. 3B, a dial base 48 formed of a synthetic resin is fixed to the unit body 17 and an outer dial 49 formed of a synthetic resin is fitted in the outer peripheral surface of the dial base 48. The outer dial 49 is caused to be rotatable and is prevented from slipping off based on the engagement of a seat portion 50 having a large diameter with the click portions 22 of the unit body 17 as shown in FIG. 4, and a pointer 51 is fixed to the outer dial 49 as shown in FIG. 3B. The gear portion 26 is formed integrally with the inner peripheral surface of the outer dial 49 and is mated with the large diameter portion 28 of the main driving gear 27.

Figure 3A:
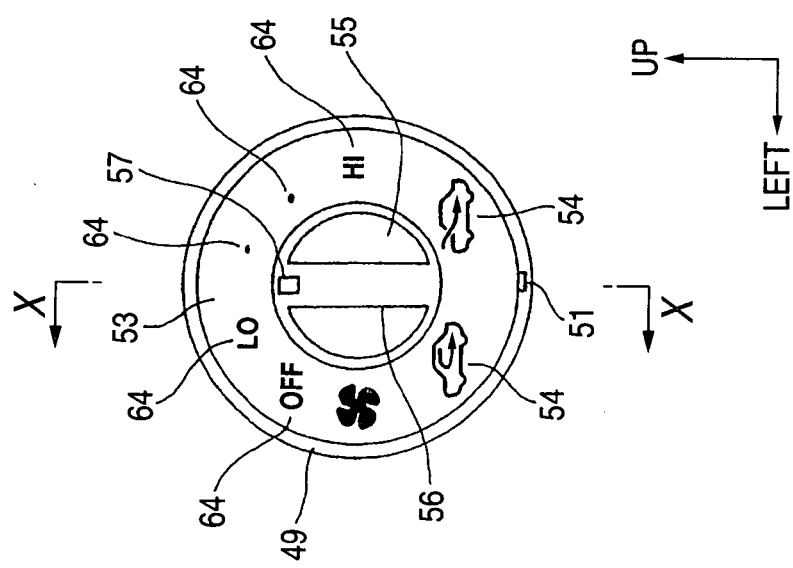

An arcuate opening portion 52 is formed on the dial base 48, and a colored opaque mark plate 53 formed of a synthetic resin is fixed into the opening portion 52 as shown in FIG. 3A. Two transparent intake marks 54 are fixed to the mark plate 53. When the pointer 51 is selectively opposed to the outer peripheral portion of the intake mark 54 based on the rotating operation of the outer dial 49, the cable 15 is moved corresponding to the position of the rotating operation of the outer dial 49. Consequently, the air conditioner detects the position of the movement of the cable 15 and selectively opens an intake for inside air which serves to take in the inside air or an intake for outside air which serves to take in the outside air depending on the result of the selection of the intake mark 54.

As shown in FIG. 3A, a colored opaque inner dial 55 formed of a synthetic resin is rotatably attached to the inner peripheral surface of the dial base 48 and a protruded dial operating portion 56 is formed integrally with the front surface of the inner dial 55. The front end of a lens 57 to function as a pointer is fixed to the dial operating portion 56 as shown in FIG. 3B and lens 57 is illuminated based ON operation of the lamp 43 of the switch board 36.

A shaft 59 of a contact holder 58 is fixed to the inner dial 55. A movable contact 61 is coupled to the contact holder 58 through a contact spring 60. By the spring force of the contact spring 60, the movable contact 61 is pushed against a fixing contact 62. The fixing contact 62 constitutes a blower switch 63 together with the movable contact 61 and is fixed to the switch board 36. The blower switch 63 is electrically connected to the air conditioner based on the fitting of the harness connecter to the connector housing 47, and the air conditioner sets the amount of the blow-off of the wind based on a signal output from the blower switch 63.

As shown in FIG. 3A, a plurality of transparent blower marks 64 are fixed to the mark plate 53. The blower marks 64 and the intake marks 54 are illuminated based on the ON operation of the lamps of the switch board 36. When the lens 57 is selectively opposed to the inner peripheral portion of the blower mark 64 based on the rotating operation of the inner dial 55, a signal corresponding to the position of the rotation of the inner dial 55 is output from the blower switch 63. Consequently, the air conditioner sets the amount of the blow-off of the wind based on the signal output from the blower switch 63, thereby regulating the amount of the blow-off of the wind to have a value corresponding to the result of the selection of the blower mark 64.

3. Temperature Control Unit 3

The temperature control unit 3 shares a large number of components together with the mode selecting unit 1, and different portions from the mode selecting unit 1 are as follows.

An air conditioning mark 65 is positioned in the forward part of the lamp 43 and is fixed to the knob 40 as shown in FIG. 4. In the OFF state of the knob 40, the air conditioner detects the OFF state of the switch 37 to selectively cause a heater function to be valid. In this state, the LED 44 is turned OFF so that the driver is informed of the OFF state of an air conditioning function. In the ON state of the knob 40, moreover, the air conditioner detects the ON state of the switch 37 to selectively cause the air conditioning function to be valid. In the ON state, the lens 42 emits a light based on the ON operation of the LED 44 so that the driver is informed of the ON state of the air conditioning function.

Two temperature marks 66 are fixed to the dial 24. When the predetermined position of the temperature mark 66 is opposed to the outer peripheral portion of the pointer 35 based on the rotating operation of the dial 24, the cable 15 is moved corresponding to the position of the rotation of the dial 24 and the air conditioner sets the blow-off temperature of the wind corresponding to the position of the movement of the cable 15.

According to the first example, the gear portion 26 is provided on the inner peripheral surface of the dial 24 and the air conditioner is operated based on the transmission of the operating force of the dial 24 from the gear portion 26 to the cable 15 through a main driving gear 27 and the driven gear 31. Consequently, it is not necessary to provide a rotary shaft as a member for transmitting an operating force to the central part of the dial 24. Therefore, a space can be maintained in the central part of the dial 24. Thus, it is possible to decrease restrictions in the case in which the knob 40 or the inner dial 55 is to be arranged as a separate component.

Next, a second example of the invention will be described with reference to FIGS. 6A and 6B. A dial base 48 is fixed to a unit body 17 of a mode selecting unit 1 as shown in FIG. 6B, and a plurality of mode marks 34 are fixed to a mark plate 53 of the dial base 48 as shown in FIG. 6A. A knob 40 is slidably inserted in a longitudinal direction in the inner peripheral surface of the dial base 48 as shown in FIG. 6B, and a switch 37 is ON operated through a knob holder 39 in the operation for pressing the knob 40 in.

An outer dial 49 is attached to the unit body 17. The outer dial 49 is caused to be rotatable and is prevented from slipping off based on the engagement of a seat portion 50 having a large diameter with a plurality of click portions 22 of the unit body 17, and a gear portion 26 is formed integrally with the inner peripheral surface of the outer dial 49. The gear portion 26 of the outer dial 49 is mated with a large diameter portion 28 of a main driving gear 27.

A pointer 51 is fixed to the outer dial 49. When the pointer 51 is selectively adapted to a mode mark 34 based on the rotating operation of the outer dial 49, an operating force is transmitted from the gear portion 26 and the main driving gear 27 to a driven gear 31. Then, a cable 15 is moved and operated corresponding to the position of the rotation of the outer dial 49 so that an air conditioner opens a blow-off port corresponding to the result of the selection of the mode mark 34.

Figure 7:
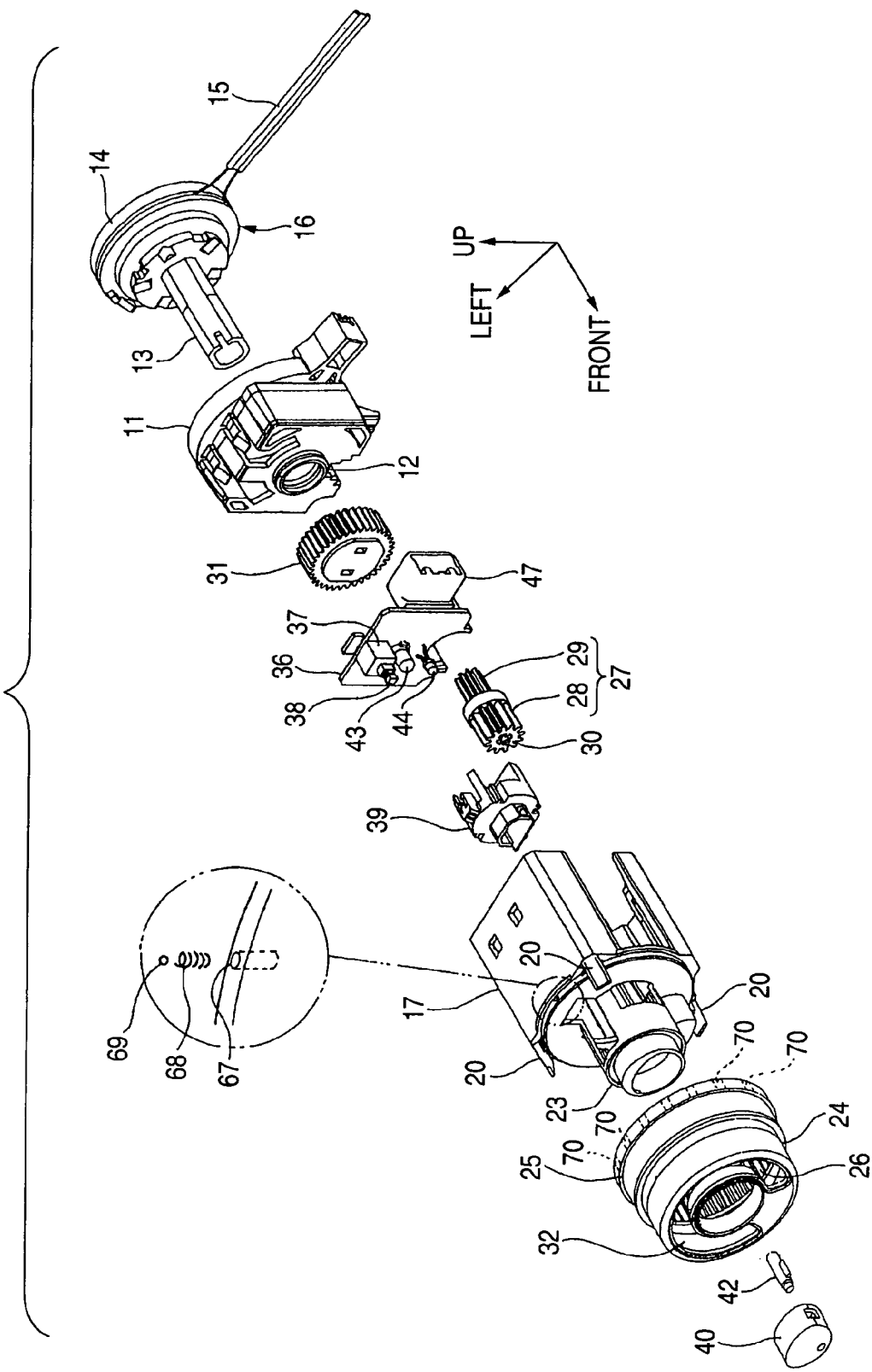
FIG. 7 is a view corresponding to FIG. 2, illustrating a third example of the invention.

Next, a third example of the invention will be described with reference to FIG. 7. A concave housing 67 is formed integrally with a unit body 17 of a mode selecting unit 1, and a moderation spring 68 is accommodated in the housing 67. A moderation ball 69 is fixed to the tip portion of the moderation spring 68. The moderation ball 69 is pushed against the inner peripheral surface of a dial 24 by the spring force of the moderation spring 68. A plurality of moderation concave portions 70 is formed integrally with the inner peripheral surface of the dial 24. When the moderation ball 69 is engaged with the inside of the moderation concave portion 70 in the operation of the dial 24, it is moved toward an outer peripheral side by the spring force of the moderation spring 68. When the moderation ball 69 corresponds to the residual part of the moderation concave portion 70, it is moved toward an inner peripheral side against the spring force of the moderation spring 68. When the dial 24 is operated, accordingly, a feeling of moderation corresponding to a change in the direction of the movement of the moderation ball 69 is generated.

Next, a fourth example of the invention will be described with reference to FIGS. 8A to 8C. An intake mark 54 is fixed to a knob 40 of a mode selecting unit 1. An air conditioner selectively opens an intake for inside air based on the detection of the OFF state of a switch 37 in the non-push-in operation of the knob 40 and selectively opens an intake for outside air based on the detection of the ON state of the switch 37 in the push-in operation of the knob 40. Moreover, a rear defogger mark 41 is fixed to a mark plate 53 of a blower unit 2. When a pointer 51 of an outer dial 49 is adapted to the rear defogger mark 41, the air conditioner causes a rear defogger function to be valid.

Figure 9:
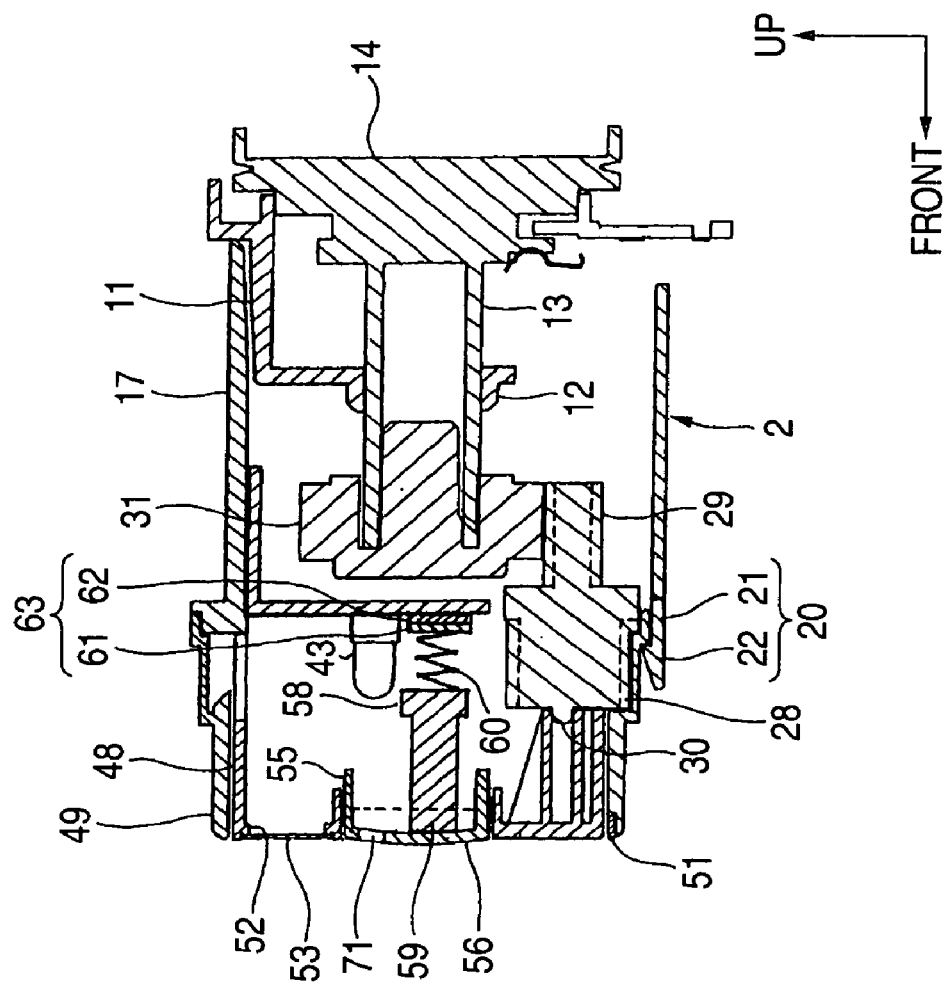
FIG. 9 is a view corresponding to FIG. 3B, illustrating a fifth example of the invention.

While the lens 57 is illuminated based on the projection of a light on the lens 57 of the blower unit 2 in the first to fourth examples, this is not restricted but a through hole-shaped opening portion 71 having a constant width may be formed on an inner dial 55 of a blower unit 2 to function as a pointer based on the emission of a light projected from a lamp 43 to an outside through the opening portion 71 as shown in FIG. 9 illustrating a fifth example of the invention, for example. With this structure, it is not necessary to illuminate a lens 57 based on the irradiation of the light projected from the lamp 43 on the lens 57. For this reason, the lens 57 can be eliminated. Consequently, a structure can be simplified so that a cost can be reduced.

While the through hole-shaped opening portion 71 having a constant width is formed on the inner dial 55 in the fifth example, moreover, this is not restricted but a taper hole-shaped opening portion having a width increased gradually forward may be formed to enhance the visual recognizing property of the pointer based on an increase in a degree of diffusion of an emitted light, for example.

While the driven gear 31 is fixed to the shaft 13 of the cable unit 16 in the first to fifth examples, furthermore, this is not restricted but the driven gear 31 may be formed integrally with the shaft 13, for example.

What is claimed is:

1. An operating device of an air conditioner for a vehicle, comprising:
    an outer dial provided rotatably;
    a ring gear portion that is provided on an inner peripheral surface of the outer dial;
    a main driving gear that includes a first gear portion to be engaged with the ring gear portion and a second gear portion integrated with the first gear portion;
    a driven gear that is engaged with the second gear portion of the main driving gear and is rotated according to a transmission of an operating force of the outer dial through the main driving gear; and
    an operating member that is coupled to the driven gear and serves to operate the air conditioner based on the rotation of the driven gear,
    wherein the main driving gear and the driven gear rotate in the same plane, and wherein the axes of rotation of the main driving gear and the driven gear are perpendicular to the plane.

2. The operating device according to claim 1, wherein an axis of rotation of the outer dial is offset from the axis of rotation of the main driving gear.

3. The operating device according to claim 1 further comprising an operable knob that is provided in a central part of the dial and is operable to push a switch.

4. The operating device according to claim 1 further comprising an inner dial that is rotatably provided in a central part of the dial.

5. An operating device of an air conditioner for a vehicle, comprising:
    an outer dial provided rotatably;
    a ring gear portion that is provided on an inner peripheral surface of the outer dial;
    a main driving gear that includes a first gear portion to be engaged with the ring gear portion and a second gear portion integrated with the first gear portion;
    a driven gear that is engaged with the second gear portion of the main driving gear and is rotated according to a transmission of an operating force of the outer dial through the main driving gear; and
    an operating member that is coupled to the driven gear and serves to operate the air conditioner based on the rotation of the driven gear,
    wherein the main driving gear is capable of rotating about a first axis,
    the driven gear is capable of rotating about a second axis, and
    the first axis and the second axis are parallel to each other.

6. The operating device according to claim 5, wherein the first axis is offset from the second axis.

7. The operating device according to claim 5, further comprising an operable knob that is provided in a central part of the outer dial and is operable to push a switch.

8. The operating device according to claim 5, further comprising an inner dial that is rotatably provided in a central part of the outer dial.

9. An operating device of an air conditioner for a vehicle, comprising:
    an outer dial provided rotatably;
    a ring gear portion that is provided on an inner peripheral surface of the outer dial;
    a main driving gear that includes a first gear portion to be engaged with the ring gear portion and a second gear portion integrated with the first gear portion;
    a driven gear that is engaged with the second gear portion of the main driving gear and is rotated according to a transmission of an operating force of the outer dial through the main driving gear; and
    an operating member that is coupled to the driven gear and serves to operate the air conditioner based on the rotation of the driven gear,
    wherein the main driving gear has a first plane of rotation,
    the driven gear has a second plane of rotation,
    and the first plane of rotation is parallel to the second plane of rotation.

10. The operating device according to claim 9, wherein a rotating axis of the outer dial is offset from a rotating axis of the main driving gear.

11. The operating device according to claim 9, further comprising an operable knob that is provided in a central part of the outer dial and is operable to push a switch.

12. The operating device according to claim 9, further comprising an inner dial that is rotatably provided in a central part of the outer dial.

* * * * *